United States Patent
Balepin

(10) Patent No.: US 6,202,404 B1
(45) Date of Patent: Mar. 20, 2001

(54) METHOD AND APPARATUS FOR REDUCING THE TEMPERATURE OF AIR ENTERING A COMPRESSOR OF A TURBOJET ENGINE BY VARIABLY INJECTING FLUID INTO THE INCOMING AIR

(75) Inventor: Vladimir Balepin, Butte, MT (US)

(73) Assignee: MSE Technology Applications, Inc., Butte, MT (US)

( * ) Notice: Subject to any disclaimer, the term of this patent is extended or adjusted under 35 U.S.C. 154(b) by 0 days.

(21) Appl. No.: 09/168,620

(22) Filed: Oct. 9, 1998

(51) Int. Cl.$^7$ .................................................. F02C 3/30
(52) U.S. Cl. .................................... 60/204; 60/39.05
(58) Field of Search ............................ 60/728, 204, 39.53, 60/39.05, 39.3

(56) References Cited

U.S. PATENT DOCUMENTS

| | | | |
|---|---|---|---|
| 3,635,029 | * 1/1972 | Menioux | 60/224 |
| 3,677,012 | * 7/1972 | Batscha | 60/262 |
| 4,214,435 | * 7/1980 | Campbell | 60/39.05 |
| 5,463,873 | * 11/1995 | Early et al. | 62/121 |
| 5,669,217 | * 9/1997 | Anderson | 60/39.05 |
| 5,694,768 | * 12/1997 | Johnson et al. | 60/226.3 |
| 6,012,279 | * 1/2000 | Hines | 60/39.05 |

* cited by examiner

Primary Examiner—Charles Frey
Assistant Examiner—Robert Z. Evora
(74) Attorney, Agent, or Firm—Peter Tribulski

(57) ABSTRACT

A turbojet engine has a capability for propelling an air-borne vehicle over an extremely wide range of operating speeds. A vehicle can be propelled from take-off conditions through speeds in excess of Mach 5. The engine is equipped with a cooling fluid injection system which cools intake air at high operating speeds. Cooling of intake air permits continued turbojet engine operation at speeds which produce stagnation air inlet temperature in excess of those which critical compressor components can tolerate. The inlet air entering the compressor is pre-cooled with injected fluid so that its temperature is reduced below the critical operating temperature limits of the critical compressor components.

10 Claims, 3 Drawing Sheets

METHOD AND APPARATUS FOR REDUCING THE TEMPERATURE OF AIR ENTERING A COMPRESSOR OF A TURBOJET ENGINE BY VARIABLY INJECTING FLUID INTO THE INCOMING AIR

FIELD OF THE INVENTION

The invention relates to turbine engines for high speed airborne vehicles.

BACKGROUND OF THE INVENTION

In the field of aeronautics, there is a long standing need for vehicles which can travel with a wide range of controllable speeds. It is desirable to have speed control capability which permits a vehicle to fly at near stall conditions to permit controlled landings and takeoffs. On the other hand, it is desirable to have an ability to fly the same vehicle at speeds in the range of Mach 4 to Mach 7.

It is well known that vehicles can be equipped with rocket engines in order to permit them to fly at speeds above Mach 4. But rocket propulsion can not support a long range sustained flight in the atmosphere because rocket engines has low specific impulse, i.e., low fuel efficiency.

It is also well known that turbojet engines, which use hydrocarbon fuels, have the capability of driving a vehicle with a controllable range of speeds from stall through about Mach 3. An addition of a ramjet can extend this speed range to about Mach 5. But a vehicle with an added ramjet is additionally heavy and complex. Such vehicles have additional drag. Also, integration of two different engine systems presents many operational difficulties.

These and other design dilemmas have led most developers of high speed engines away from hydrocarbon fueled designs. Most recent efforts at developing high speed engines, i.e., above Mach 3, have been directed to turbojet engines which use cryogenic hydrogen as a fuel. Examples of these engines are disclosed in (ATREX Paper from 1995) and U.S. Pat. No. 5,272,870, (Greib, et al.).

This design evolution has occurred largely because of the high stagnation temperatures which occur in front of compressors of these engines at high Mach numbers. Temperatures in the air inlet of a vehicle traveling at Mach numbers in the range of 5 to 6 reach 1300° to 1700° K As a result there is a recognized need to perform precooling of incoming air before it reaches the compressor. This prior art recognition of a need for pre-cooling has been met with heat exchangers that utilize a cooling effect of liquid hydrogen expanding into a gas. In other words, the prior art cryogenic engines use cooling properties of their fuels as a mechanism for pre-cooling of incoming air.

While these cryogenic systems can produce the needed cooling, they do so at a high cost in vehicle weight and complexity. Closed system heat exchangers are inherently heavy and they produce undesirable drag.

Additionally, use of hydrogen as a fuel has several disadvantages. Hydrogen's low density requires larger vehicle structures. Cryogenic hydrogen is difficult to handle. Difficulties in handling hydrogen are encountered at sea level where fueling of aircraft occurs. The difficulties do not end on the ground. Safe handling of hydrogen in flight requires many expensive and complex control systems on a vehicle. As a result, vehicles with hydrogen engines become very expensive.

Thus, when the complexity of hydrogen cooling is added to the inherent complexity of hydrogen fuel handling, the resultant engine emerges as one which is realistically applicable only to a narrow class of vehicle, namely Earth-to-orbit launchers. There is a clear need for a simpler design. This need for a simpler engine design is particularly acute for propelling expendable low-cost vehicles.

It is a goal of the present invention therefore to provide an aircraft engine which can produce a wide range of aircraft speeds and which is based on relatively simple hydrocarbon fuel technology.

SUMMARY OF THE INVENTION

The present invention is directed to a method of propelling an air borne vehicle with a turbojet engine. The method comprises reducing the temperature of air entering a compressor of the engine by injecting fluid into the air at a variable rate and permitting the fluid to evaporate into a gas. The rate of fluid injection is great enough to cool the inlet air to a temperature sufficiently lower than a desired compressor outlet temperature so that temperature increases produced by action of the compressor do not result in the outlet temperature exceeding the desired outlet temperature. The variable rate of fluid injection is controlled in response to changes in velocity of the vehicle that produce changes in the inlet air temperature. Thus the outlet temperature of the compressor is maintained within a desired operating range.

Viewed from another aspect, the present invention is directed an apparatus for propelling an air borne vehicle with a turbojet engine. The apparatus comprises means for reducing the temperature of air entering a compressor of the engine by injecting fluid into the air at a variable rate and permitting the fluid to evaporate into a gas. The rate of fluid injection is great enough to cool the inlet air to a temperature sufficiently lower than a desired compressor outlet temperature so that temperature increases produced by action of the compressor do not result in the outlet temperature exceeding the desired outlet temperature. The variable rate of fluid injection is controlled in response to changes in velocity of the vehicle that produce changes in the inlet air temperature. Thus the outlet temperature of the compressor is maintained within a desired operating range.

The invention will be better understood from the following detailed description taken in consideration with the accompanying drawings and claims.

The drawings are not necessarily to scale.

DETAILED DESCRIPTION

Figure 1:
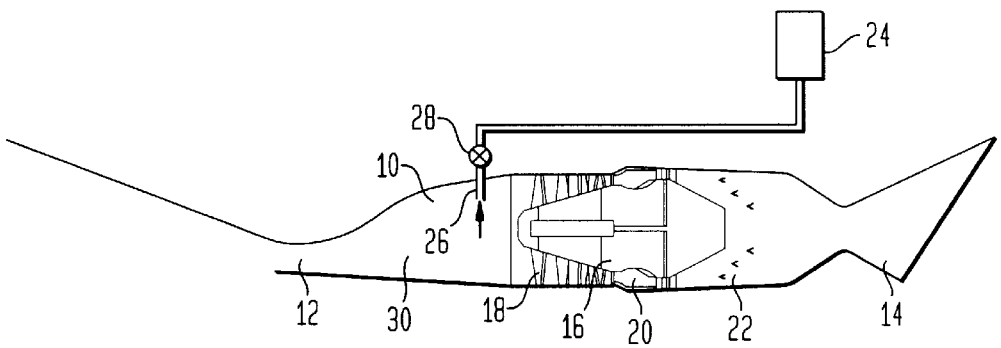
FIG. 1 is a cross-sectional view of an engine constructed in accordance with the present invention.

Referring now to FIG. 1, there is shown a cross-sectional view of an engine 10 constructed and operated in accordance with the present invention. The engine comprises an air inlet 12, an exhaust nozzle 14, and a turbomachine 16. The turbomachine 16 includes a compressor 18, a main combustor 20. In some versions of the engine 10 an afterburner 22 is included. A liquid reservoir 24 is connected to an injector designated 26. The injector 26 is provided with a control valve 28.

In operation, the engine 10 is capable of propelling a vehicle at speeds from takeoff to Mach 6. When speeds are relatively low, i.e., below Mach 3, the engine 10 operates like a conventional turbojet. Incoming air passes through the air inlet 12 and is compressed in the compressor 18. Hydrocarbon fuel is burned in the main combustor 20. This powers the turbomachine 16. Emerging gas is further heated in the afterburner 22 and this provides engine thrust when expanded through the nozzle 24.

As the speed of a vehicle approaches and exceeds Mach 3, the stagnation temperature at an inlet end of the compressor 18 increases beyond permissible operational limits of the compressor. At this speed the injector 26 is activated. The injector 26 injects fluid into a subsonic region 30 of the air inlet 12. Evaporation of the fluid produces cooling of the incoming air to a temperature within the operating limits of the compressor 18.

The injector 26 is operated in response to control systems which regulate fluid flow through the valve 28. One system of controls utilizes conventional temperature sensing devices (illustrated in FIG. 3 and described hereinbelow) and produces a temperature sensitive method of control. An alternative system of controls (not shown) employs conventional speed sensitive controlling mechanisms.

It should be noted that the concept of injecting fluid into a turbojet is known in the prior art. For certain operational conditions such as takeoffs in mountainous or high temperature desert areas, engines have been equipped with fluid injectors. This injected fluid has been used to produce extraordinary thrust for peak operating conditions such as takeoff. Typically, fluid injected in these circumstances is delivered without any attempts to control engine temperature and without any consideration of where the fluid evaporates. Indeed it is advantageous to avoid evaporation of the fluid in these prior art cases because liquid droplets of fluid produce maximum mass flow through the engine.

The present invention is a substantial departure from this prior system of thrust enhancement. The present invention is directed to an entirely different goal.

The fluid injected into the engine 10 at high Mach numbers, in accordance with the present invention, is completely evaporated and mixed with the high temperature intake air before emerging from the compressor. In operating the inventive engine 10 at high speeds, it is important to extract all of the available cooling capability from the fluid coming from the reservoir 24. The mass of cooling water carried on the vehicle effects the overall range of the vehicle in the same way that the mass of fuel effects the range. In this context, effective use of cooling water can be said to be an operative factor in optimizing fuel efficiency. A full understanding of how this optimization is achieved can be had by referring to FIGS. 2, 3 and 4.

Figure 2:
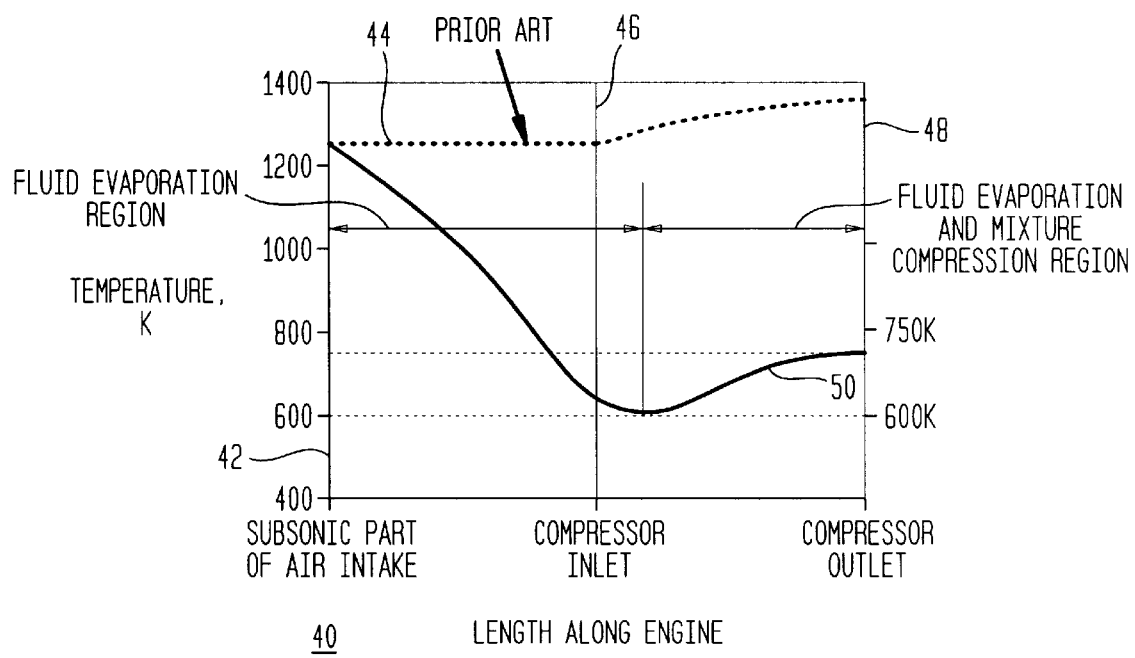
FIG. 2 is a graph showing a comparison of temperature profile developed in accordance with the present invention as compared to a temperature profile developed in the prior art.

Referring now to FIG. 2 there is shown a graphical representation of a temperature profile along a portion of an aircraft engine. A temperature graph 40 shows that at a line 42, that represents an air inlet of an engine, a temperature of 1250° K. exists. This stagnation temperature is typical of an aircraft engine that is moving through the atmosphere at a speed of about Mach 5.

A graph line 44 shows a temperature profile for air which passes through a prior art turbojet engine. The air temperature in the prior art engine enters at 1250° K. The air then passes a compressor inlet, shown by a line 46, at approximately the same temperature. After entering the compressor, the air temperature is increased through action of the compressor. Finally, the air emerges from an outlet of the compressor, shown by a line 48, at a temperature approaching 1400° K.

In reality, this prior art temperature line 44 is only a hypothetical representation. There are no presently known turbojet engines which can operate at these extreme inlet temperatures. As a practical matter, it is necessary to maintain compressor outlet temperature below 750° K. This is a function of temperature limits to which various compressor materials can be exposed without loss of structural integrity.

A temperature profile line 50 shows how the present invention produces the desired outlet temperature on a vehicle that is traveling at Mach 3 or higher.

The temperature line 50 begins at the air intake line 42 with a temperature of 1250° K. In a region between the air intake line 42 and the compressor inlet line 46, there occurs a substantial reduction in temperature. This reduction is produced by evaporation of fluid which is injected into the air inlet.

When a temperature of 750° K. or less is desired at the compressor outlet, it is necessary to reduce the air temperature at the compressor inlet to a temperature well below 750° K. This is because the compressor (which at this phase of a flight will be producing a compression ratio of about 2:1) produces a temperature increase of 150° K. in the air which passes through the compressor. Thus it is necessary to reduce compressor inlet temperature at least 150° K. less than 750° K.

Figure 3:
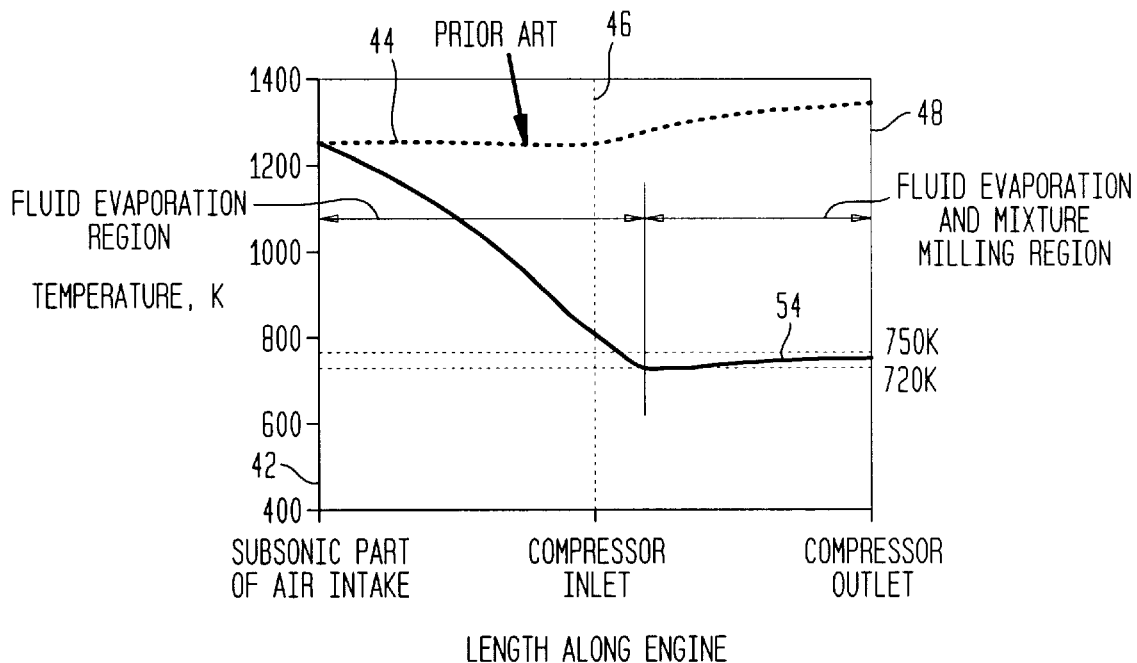
FIG. 3 is a graph showing a comparison of temperature profile developed in accordance with the present invention as compared to a temperature profile developed in the prior art.

Referring now to FIG. 3, a temperature profile graph 52 shows a temperature profile line 54 which is shown in the same context as the profile line 50 of FIG. 2. This case is illustrative of the engine 10 operating in the so-called "windmill" mode. In certain instances of high speed operation, it is advantageous to operate the engine 10 without any fuel being consumed in the combustor 20. Thrust is developed by fuel burning in the afterburner 22. In this mode of operation, the compression ratio of the compressor is reduced to about 1.1 to 1. This lower rate of compression results is less heating of the air passing through the compressor and thus less temperature rise. The temperature rise associated with a compression of 1.1 to 1 is about 20–30K.

It can be seen in FIG. 3 that the line 54 does not need to be made lower than 720 K. Evaporative cooling of the fluid reduces the air temperature to about 720K at the inlet 46. In the "windmill" mode of operation, the air temperature reaches a temperature of about 750K at the compressor outlet 48.

There are certain circumstances when it is desirable to operate the inventive engine 10 in this mode in order to conserve cooling fluid. At speeds in excess of Mach 3, high thrust becomes less important than fuel efficiency. It must be noted that in operating the inventive engine 10, fuel efficiency relates not only to effective use of hydrocarbon fuel, but also to an effective use of cooling water.

Prior art hydrocarbon fueled engines typically are not operated in the "wind-mill" mode. Operation of a conventional or prior-art hydrocarbon engine in this mode has no inherent fuel efficiency advantages, i.e., there is no savings of hydrocarbon fuel.

But this conventional fuel efficiency analysis is not applicable to the inventive engine 10. In the case of the inventive engine 10, fuel efficiency is the combined product of saving hydrocarbon fuel and cooling water. It has been found that this combined or overall fuel efficiency is improved at speeds above Mach 3 when the engine 10 is operated in the "wind-mill" mode. Consequently, there is an increase in the range of the vehicle propelled by the inventive engine 10 operated in this mode.

Figure 4:
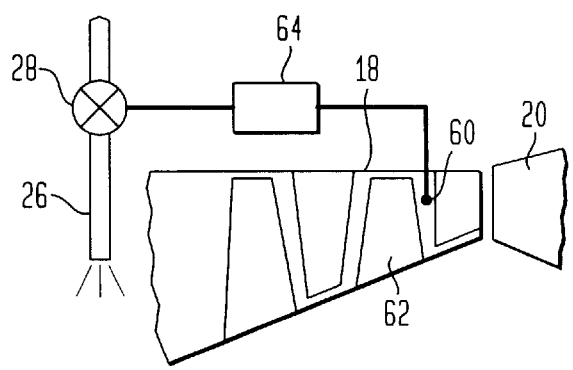
FIG. 4 is a partial cross-section of the engine of FIG. 1.

Referring now to FIG. 4, there is shown a partial sectional view of the engine 10 of FIG. 1. A temperature sensor 60 is positioned to determine air temperature near a critical compressor element, in this case, a rotor blade 62. A conventional controller 64 is interconnected between the sensor 60 and the valve 28. As the temperature near the blade 62 increases to a level close to a critical limit, about 750K, the valve 28 is opened to release fluid to the injector 26. When the air temperature near the blade 62 falls below the critical level, flow of fluid through the injector 26 is reduced. This assures the use of only that amount of fluid needed to produce the requisite cooling of inlet air. Because the cooling fluid must be carried on the vehicle and increases its weight, it is important that the fluid be used sparingly. Efficient use of the fluid has the effect of increasing the range of the vehicle.

Figure 5:
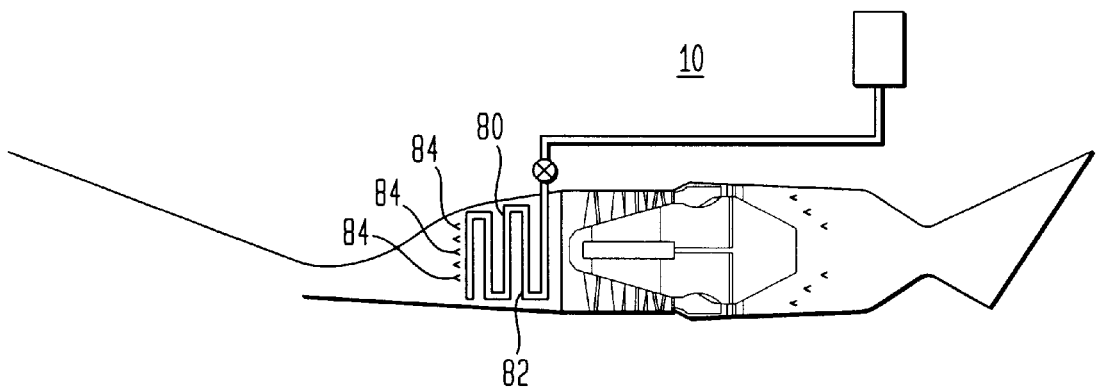
FIG. 5 is a cross-sectional view of an engine constructed in accordance with the present invention.

Referring now to FIG. 5 there is shown a cross-sectional view of another embodiment of the engine 10 of FIG. 1. In this embodiment, the injector 26 of FIG. 1 is replaced with an preheated injector 80. The preheated injector 80 consists of a heat exchanger 82 and a series of injection ports 84. Fluid passes through the heat exchanger 82 and is preheated by hot intake air. The preheated fluid is then discharged into the intake air stream in a preheated condition. The preheated fluid evaporates with very little residence time in the intake air. It can be seen that this embodiment of the inventive engine is very desirable in applications where inlet configurations produce low residence time for air or fluids in the intake air stream. In other words, employment of a heat exchanger permits the construction of engines with smaller and more compact air inlets , particularly those portions of inlets which are dedicated to producing sub-sonic inlet conditions.

Figure 6:
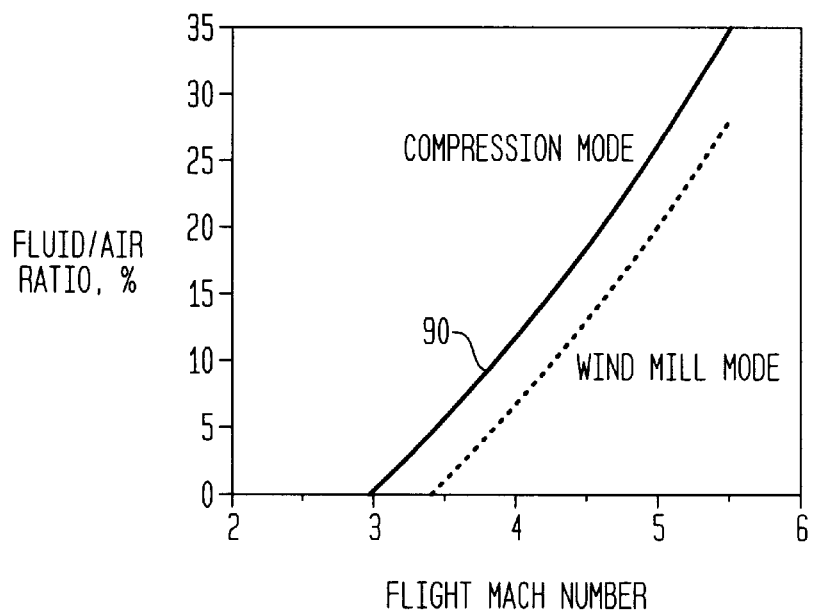
FIG. 6 is graph showing a relationship between fluid consumption and speed of a vehicle operating in accordance with the present invention.

Referring now to FIG. 6, there is shown a graphical relationship between fluid and air ratios and vehicle speed. It has been found that the inventive engine 10 can be pre-cooled with a fluid that comprises a mixture of 50% water and 50% methanol. This mixture can be injected at an initial temperature of about 233K (−40F). It can be seen from a graph line 90 of FIG. 6, that an increasingly large percentage of fluid is needed to perform cooling as a Mach number increases from about 3 to about 5. It can also be seen , by observing the graph line 92, that in the "windmill" mode of operation a lower percentage of fluid is needed for these same speeds.

FIG. 6 is constructed to reflect the cooling capacity of a 50/50 mixture of methanol and water. When the cooling fluid contains a higher fraction of water, its latent heat of vaporization and specific heat are greater and less mass of fluid is needed to produce the requisite cooling.

It is to be appreciated and understood that the specific embodiments of the invention are merely illustrative of the general principles of the invention. Various modifications may be made by those skilled in the art which are consistent with the principles set forth. For, example the engine 10 can be configured as a turbofan bypass engine instead of a turbojet engine as shown in FIG. 1.

What is claimed is:

1. A method of propelling an air borne vehicle with a turbojet engine at supersonic speeds which comprises the steps of:

conveying a source of consumable cooling fluid with the vehicle;

reducing the temperature of air entering a compressor of the engine, after the vehicle reaches supersonic speed, by injecting the consumable cooling fluid into the air at a variable rate and permitting the fluid to evaporate into a gas;

the rate of fluid injection being controlled to cool the inlet air to a temperature lower than a desired compressor outlet temperature so that temperature increases produced by action of the compressor do not result in the outlet temperature exceeding the desired outlet temperature.

2. The method of claim 1 which further comprises the step of:

controlling the variable rate of fluid injection in response to changes in inlet air temperature that result from changes in velocity of the vehicle.

3. The method of claim 1 which further comprises the step of:

preheating the consumable cooling fluid in an air intake of the engine.

4. The method of claim 1 wherein the vehicle encounters an air intake temperature in excess of about 1000K, the desired compressor outlet temperature is less than about 800K and the compressor air inlet temperature is cooled to about 150K less than the desired compressor outlet temperature.

5. The method of claim 1 which comprises the further step of controlling the variable rate of fluid injection in response to changes in velocity of the vehicle that produce changes in the inlet air temperature.

6. Apparatus for propelling an air borne vehicle with a turbojet engine at supersonic speeds which comprises:

means for conveying a source of consumable cooling fluid with the vehicle; and means for reducing the temperature of air entering a compressor of the engine by injecting the consumable cooling fluid into the air at a variable rate and permitting the fluid to evaporate into a gas, the rate of fluid injection being controlled to cool the inlet air to a temperature sufficiently lower than a desired compressor outlet temperature so that temperature increases produced by action of the compressor does not result in the outlet temperature exceeding the desired outlet temperature.

7. The apparatus of claim 6 which further comprises means for preheating fluid in an air intake of the engine.

8. The apparatus of claim 6 which further comprises means for controlling the variable rate of fluid injection in response to changes in inlet air temperature that result from changes in velocity of the vehicle.

9. The apparatus of claim 6 which further comprises means for controlling the variable rate of fluid injection in response to changes in velocity of the vehicle that produce changes in the inlet air temperature.

10. The apparatus of claim 6 wherein the vehicle encounters an air intake temperature in excess of about 1000K, the desired compressor outlet temperature is less than about 800K and the compressor air inlet temperature is cooled to about 150K less than the desired compressor outlet temperature.

* * * * *